United States Patent
Tanaka

(10) Patent No.: US 7,815,236 B2
(45) Date of Patent: Oct. 19, 2010

(54) VEHICLE SEAT AND MANUFACTURING METHOD OF VEHICLE SEAT

(75) Inventor: Yukio Tanaka, Yokohama (JP)

(73) Assignee: NHK Spring Co., Ltd., Yokohama-shi (JP)

(*) Notice: Subject to any disclaimer, the term of this patent is extended or adjusted under 35 U.S.C. 154(b) by 91 days.

(21) Appl. No.: 12/255,452

(22) Filed: Oct. 21, 2008

(65) Prior Publication Data

US 2009/0115217 A1 May 7, 2009

(30) Foreign Application Priority Data

Oct. 22, 2007 (JP) ............................. 2007-274516

(51) Int. Cl.
*B60N 7/07* (2006.01)
(52) U.S. Cl. .................................. 296/65.09
(58) Field of Classification Search ............ 296/65.09, 296/193.02, 68.1, 64, 66, 69, 65.16; 280/735; 297/378.12, 250.1
See application file for complete search history.

(56) References Cited

U.S. PATENT DOCUMENTS

| | | | | |
|---|---|---|---|---|
| 3,727,974 A | * | 4/1973 | Swenson et al. | 297/300.3 |
| 5,466,047 A | * | 11/1995 | Bauer et al. | 297/367 R |
| 5,918,934 A | * | 7/1999 | Siegrist | 297/250.1 |
| 5,971,467 A | * | 10/1999 | Kayumi et al. | 296/66 |
| 6,113,187 A | * | 9/2000 | Sugiyama et al. | 297/335 |
| 6,179,379 B1 | * | 1/2001 | Andersson | 297/216.13 |
| 6,356,200 B1 | * | 3/2002 | Hamada et al. | 340/667 |
| 6,739,658 B2 | * | 5/2004 | Pedronno et al. | 297/216.1 |
| 6,986,542 B2 | * | 1/2006 | Imajo et al. | 296/65.09 |
| 7,374,244 B2 | * | 5/2008 | Becker et al. | 297/341 |
| 7,393,056 B2 | * | 7/2008 | O'Connor | 297/378.12 |
| 7,717,509 B2 | * | 5/2010 | Kojima | 297/216.2 |
| 2007/0063567 A1 | | 3/2007 | Nakaya et al. | |
| 2010/0026068 A1 | * | 2/2010 | Yoo et al. | 297/330 |

FOREIGN PATENT DOCUMENTS

JP 2007-083780 A 4/2007

* cited by examiner

*Primary Examiner*—Kiran B. Patel
(74) *Attorney, Agent, or Firm*—Foley & Lardner LLP

(57) ABSTRACT

Disclosed is a vehicle rear seat whose seat back is foldable forwardly, comprising a seat back frame, a seat cushion frame, and a unit connected to the seat back frame and the seat cushion frame. The unit connected to the seat cushion frame comprises a pair of bases to be fixed to the vehicle body, an arm to be secured to the seat back frame, a hinge to connect the arm pivotally to one of the pair of bases, and a connecting bracket for connecting the base and the hinge. This configuration accomplishes shortened design time for vehicle seats with numerous variations.

5 Claims, 3 Drawing Sheets

VEHICLE SEAT AND MANUFACTURING METHOD OF VEHICLE SEAT

BACKGROUND OF THE INVENTION

1. Field of the Invention

The present invention relates to a vehicle seat and a manufacturing method thereof, and more particularly, relates to a structure of a unit in the vehicle seat.

2. Description of the Related Art

Conventionally, automobiles which have multiple rows of seats in its fore-and-aft direction and whose rearmost seats are foldable forwardly from an upright position have been developed. Such an automobile usually has cargo room for storing cargo behind the rearmost seats and can attain larger cargo room by folding the rearmost seats forwardly. This type of rear seats have been widely applied to sport-utility vehicles (SUVs), minivans having three rows of seats, and the like.

Numerous variations of structures and mechanisms for rear seats whose seat backs are foldable forwardly have been known in the art. The frame structure has variations such as a split rear seat arrangement in which there are a plurality of seats in the lateral direction and their frames are split, and a bench-style rear seat arrangement in which seats in the lateral direction are joined and their frames are configured integrally.

The angle adjustment mechanism for the seat backs of rear seats has variations such as a reclining mechanism in addition to the seat back forward folding mechanism, a seat back angle adjustment mechanism by manual operation, and a mechanism that adjusts the seat back angle of rear seats equipped with an electric hinge by an electric actuator. For example, Japanese Unexamined Patent Application Publication No. 2007-83780 (Nakaya) discloses a multi-functional rear seat having an electric device that can fold the rear seat forwardly and reverse (raise) it to an upright position by a remote switch at the rear gate or the driver's seat, as a matter of convenience.

These numerous seat variations make it possible to offer rear seats which meet the type of vehicle or the user needs. On the other hand, however, it has taken much time to design rear seats type-by-type so as to address the numerous variations. For example, the rear seat in the above-referenced Nakaya has a seatback angle adjustment mechanism which is mounted inside the seat back. Consequently, it has been necessary to design the seat back frame structure and the seat back angle adjustment mechanism for each type of the rear seats so that the design time has been long. Accordingly, it has been desired to shorten the time for designing rear seats with numerous seat variations.

Besides, it is preferable that the seat back of a rear seat be thinner to increase the volume capacity of the cargo room when the seat back is in an upright position or in a forward folded position. Accordingly, there is a limit of space for the seat back of a rear seat. The rear seat having an angle adjustment mechanism inside the seat back, as disclosed in Nakaya, has significant restriction on thinning the seat back.

SUMMARY OF THE INVENTION

A vehicle seat according to an aspect of the present invention comprises a seat back frame, a seat cushion frame, and a unit connected to the seat back frame and the seat cushion frame. The unit comprises a base connected to the seat cushion frame and fixed to a vehicle body, an arm secured to the seat back frame, a hinge for connecting the arm pivotally to the base, and a connector for connecting the base and the hinge. Installation of the unit accomplishes shortened design time of seats having numerous seat variations.

It is preferable that the unit further comprise a pair of bases and a beam which is secured to each of the pair of the bases to connect the pair of the bases. This increases the strength of the unit and makes the handling of the unit in manufacture easier. Moreover, it is preferable that the unit comprise at least two beams for connecting the pair of base, the two beams are each secured to both of the pair of bases to connect the pair of bases, and the pair of bases and the two beams form a rectangle. This increases the strength of the unit more steadily.

In another case, it is preferable that the unit comprise at least two beams for connecting the pair of bases, the two beams are disposed away from each other in the fore-and-aft direction, and the pair of bases are each fixed to the vehicle body at the positions away from each other in the fore-and-aft direction. This suppresses displacement of the mounting positions to the vehicle and improves the manufacturing efficiency of the vehicle. Preferably, the unit further comprises a pivot angle adjustment mechanism for the arm. This accomplishes numerous seat variations more easily and thinner seat bodies.

Another aspect of the present invention is a manufacturing method of a vehicle seat whose seat back is foldable forwardly. This method manufactures a unit comprising a base, an arm, a hinge for connecting the arm pivotally to the base, and a connector for connecting the base and the hinge. It connects a seat back frame to the arm of the unit. Then, it connects a seat cushion frame to the base of the unit. Forming the unit accomplishes shortened design time of seats having numerous seat variations. Moreover, it improves the manufacturing efficiency.

Preferably, the manufacturing method connects a pair of bases by a beam. More preferably, the pair of bases are connected by two beams so that the pair of base and the two beams form a rectangle. This increases the strength of the unit more steadily and prevents deformation of the unit in handling. Preferably, each of the pair of bases has fixing positions to a vehicle body at the front and the rear, the pair of bases are connected by two beams, and one of the two beams is connected to the base at a position closer to the front fixing position than the other beam and the other beam is connected to the base at a position closer to the rear fixing position than the one of the two beams. This suppresses displacement of the mounting positions to the vehicle and improves the manufacturing efficiency of the vehicle.

The present invention can shorten the design time of vehicle seats of numerous seat variations. The above and other objects, features and advantages of the present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
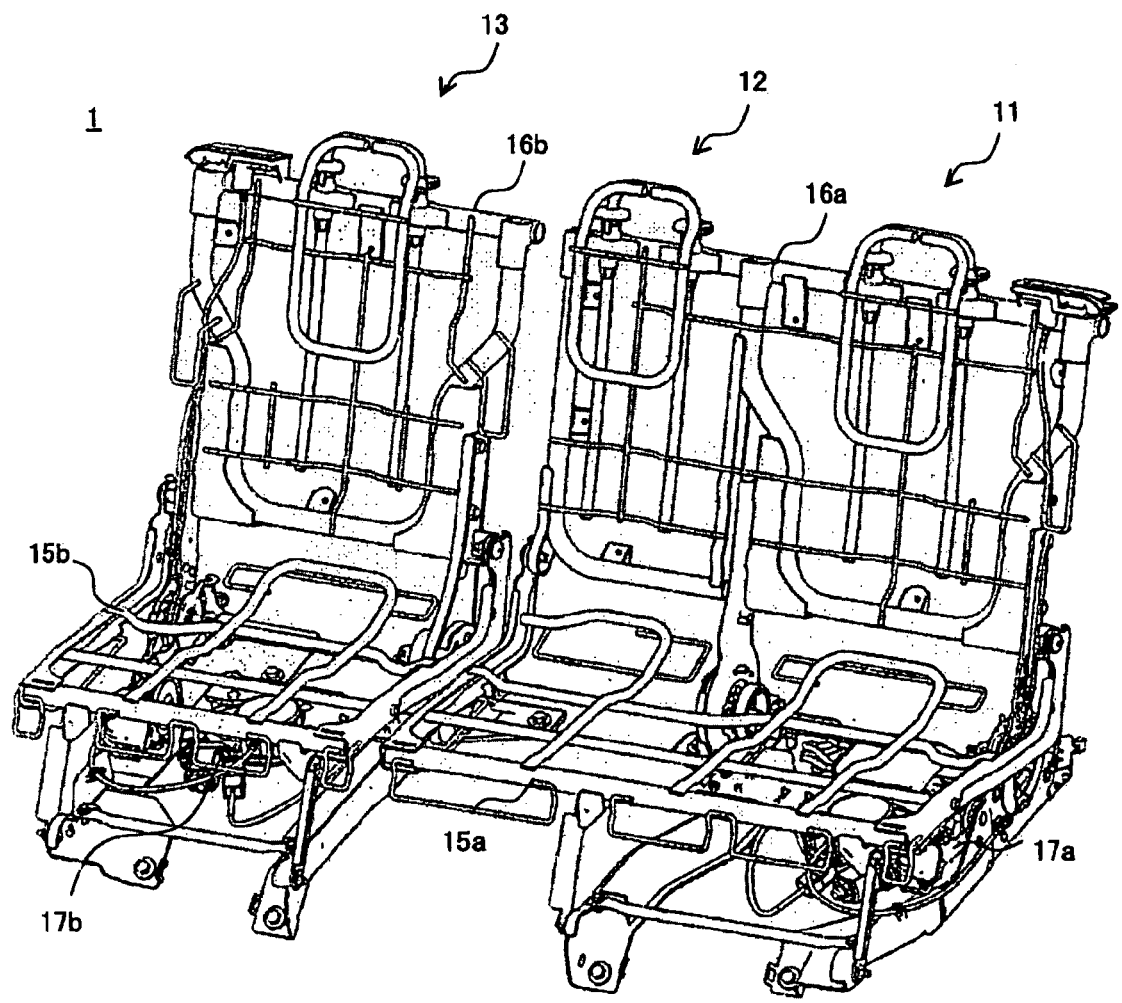
FIG. 1 is a perspective view illustrating the entire frame structure of a vehicle rear seat according to an embodiment of the present invention.

Hereinafter, a preferred embodiment to which the present invention is applicable will be described. For clarity of explanation, the following descriptions and the accompanying drawings may contain omissions or simplifications as appropriate. Throughout the drawings, the like components are denoted by the like reference numerals and repetitive descriptions are omitted if not necessary. The present embodiment has a feature in a unit in a vehicle rear seat.

The vehicle rear seat according to the present embodiment comprises a unit configured separately from the seat body which consists of a seat cushion and a seat back. The unit comprises an arm to be connected to the seat back and a hinge connected to the arm; the arm pivots about the rotational shaft of the hinge. Including the movable parts (the arm and the hinge) for folding the seat back forward in the unit separate from the seat body allows the type-by-type design of rear seats addressing numerous seat variations to be easier.

FIG. 1 is a perspective view illustrating the frame structure of the vehicle rear seat 1 according to the present embodiment. The vehicle rear seat 1 of the present embodiment is a split bench-style seat consisting of three seats 11 to 13 arranged in the lateral direction of the vehicle body; the two seats 11 and 12 from the right as seen from the front of the vehicle are configured by an integrated continuous frame and the left seat 13 is split from the other seats 11 and 12.

The seats 11 and 12 comprise an integrated seat cushion frame 15a, a seat back frame 16a, and a unit 17a. The seat 13 comprises a seat cushion frame 15b, a seat back frame 16b, and a unit 17b. The frame of the seats 11 and 12 and the frame of the seat 13 are formed substantially the same except that the former is a frame for two adjoining seats and the latter is a frame for one seat. The units 17a and 17b have substantially the same configuration. Accordingly, the descriptions hereinafter will be given on the seats 11 and 12.

The unit 17a is configured separately from the seat body frame consisting of the seat cushion frame 15a and the seat back frame 16a. The unit 17a is manufactured and carried as a component. In manufacturing a vehicle, a unit 17a is manufactured, a seat cushion frame 15a and a seat back frame 16a are connected to the unit 17a, and the finished rear seat is fixed to the vehicle body. This structure of the unit 17a separate from the seat body accomplishes shortened type-by-type design time of vehicle rear seats of numerous seat variations. The seat cushion frame 15a and the seat back frame 16a are made of a plurality of pipes, brackets, wires, and the like.

A seat cushion functions as a part on which a passenger sits down. A seat cushion pad (not shown) is fitted around the seat cushion frame 15a and covered by a seat cushion cover (not shown). A seat back functions as a back rest on which a passenger leans his/her back. A seat back pad (not shown) is fitted around the seat back frame 16a and covered by a seat back cover (not shown). The seat back and the seat cushion constitute a seat body and the unit 17a is configured separately from the seat body.

The seat back of the rear seat 1 according to the present embodiment is movable and the seat back frame 16a is foldable forwardly from an upright position. FIG. 1 shows the rear seat 1 whose seat back frame 16a is in the upright position. Folding the seat back forwardly permits cargo room behind the seat back to expand. Typically, the seat cushion frame 15a sinks as the seat back frame 16a collapses, which increases the volume capacity of the cargo room.

Figure 2:
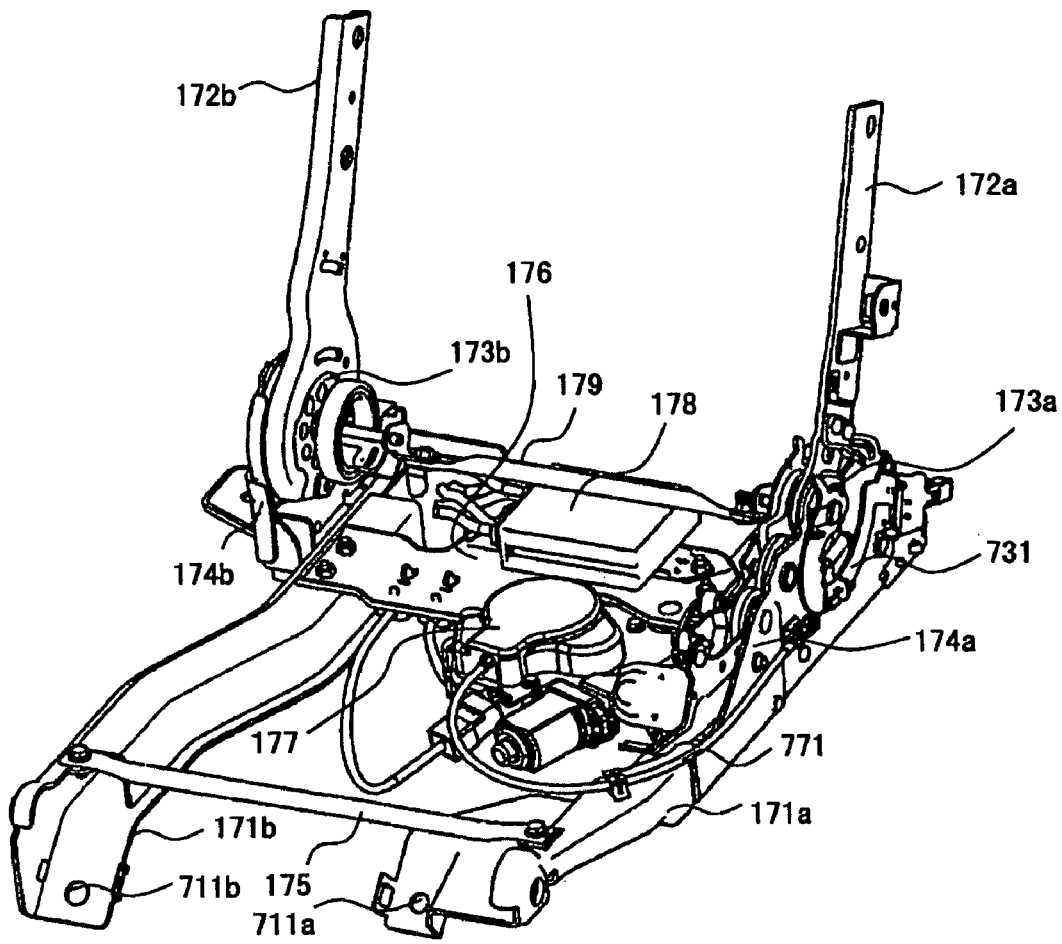
FIG. 2 is a perspective view illustrating the configuration of a unit according to an embodiment of the present invention.

The unit 17a is disposed under the seat cushion frame 15a, connected to the seat cushion frame 15a, and fixed to the vehicle body. The unit 17a connects the seat cushion frame 15a to the seat back frame 16a as well as to the vehicle body. FIG. 2 is a perspective view illustrating the configuration of the unit 17a and FIG. 3 is an exploded perspective view illustrating the configuration of the unit 17a.

Figure 3:
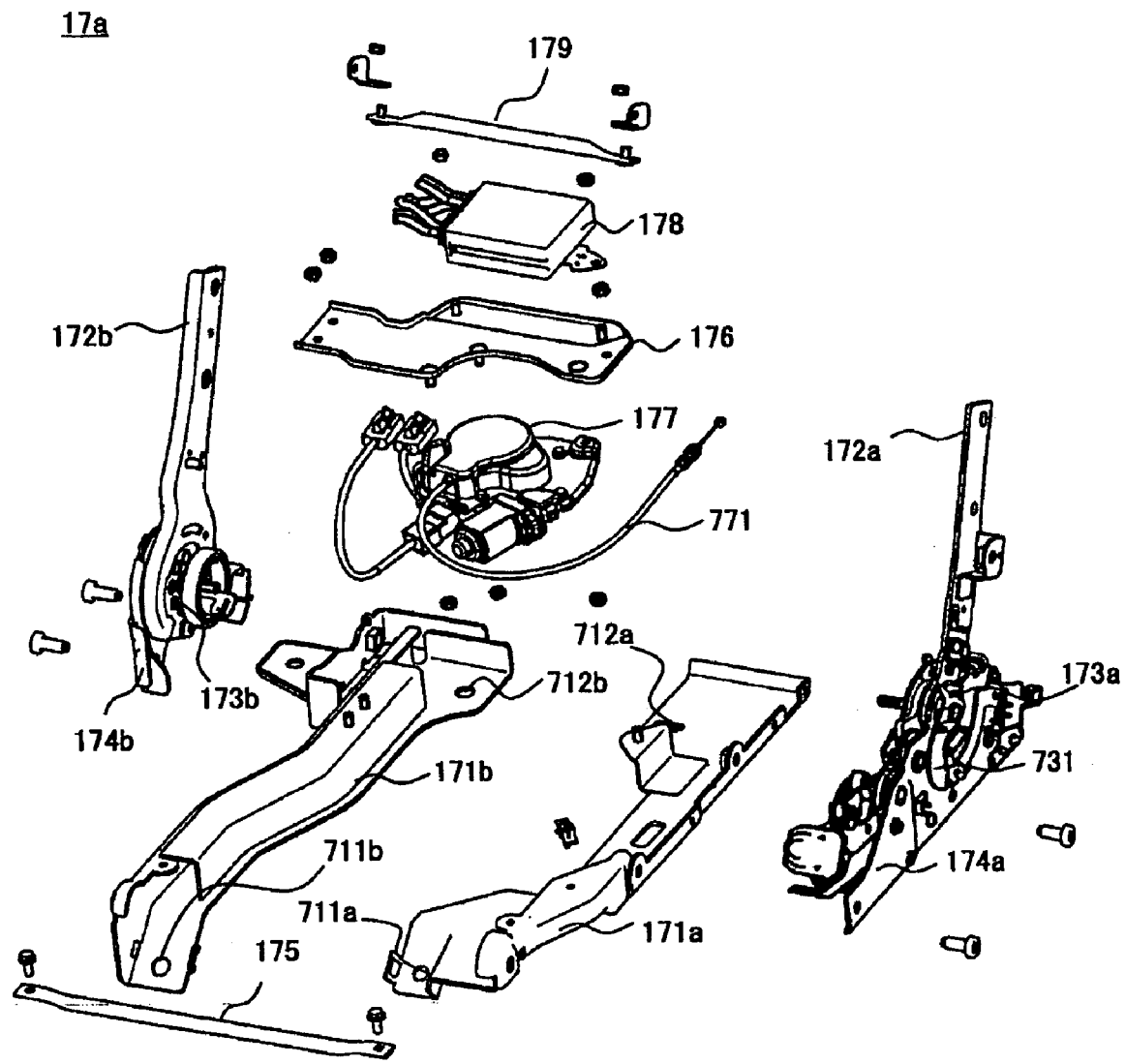
FIG. 3 is an exploded perspective view illustrating the configuration of a unit according to an embodiment of the present invention.

As illustrated in FIG. 3, the unit 17a comprises a pair of bases 171a, 171b and a pair of arms 172a, 172b. The arms 172a, 172b are secured to hinges 173a, 173b, respectively. Hinge connecting brackets 174a, 174b are also secured to the hinges 173a, 173b, respectively. As illustrated in FIG. 2, the hinge connecting brackets 174a, 174b are secured to the bases 171a, 171b, respectively. In this way, the hinge connecting brackets 174a, 174b, which are connectors, connect the hinges 173a, 173b to the bases 171a, 171b, respectively. In addition, the hinge connecting brackets 174a, 174b connect the arms 172a, 172b to the bases 171a, 171b, respectively.

As illustrated in FIG. 2, a pair of bases 171a and 171b are connected by a base connecting shaft 175 and a base connecting bracket 176. The base connecting shaft 175 and the base connecting bracket 176, which are beams, are bolted or riveted to the bases 171a and 171b. In most cases, securing the components of the rear seat 1 of the present embodiment is made by bolts or rivets.

As shown in FIG. 1, the bases 171a and 171b are connected to the seat cushion frame 15a. The bases 171a and 171b are also fixed to the vehicle body. The bases 171a and 171b lie in the fore-and-aft direction. The longitudinal directions of the bases 171a and 171b are substantially parallel to each other and are substantially the same as the fore-and-aft direction. As illustrated in FIG. 2, the base connecting shaft 175 connects the bases 171a and 171b at the front and the base connecting bracket 176 connects the bases 171a and 171b at the rear.

The base connecting shaft 175 and the base connecting bracket 176 are disposed apart in the fore-and-aft direction and their longitudinal directions are substantially parallel. In this way, the bases 171a, 171b, the base connecting shaft 175, and the base connecting bracket 176 form a rectangle. Forming a rectangle by the bases 171a, 171b, the base connecting shaft 175, and the base connecting bracket 176 increases the strength of the unit 17a and the easiness in handling the unit 17a in manufacturing of the vehicle. Moreover, if an assistant tool for lifting up the rear seat is used in mounting the rear seat on the vehicle, even if arms of the assistant tool contact the under surface of the rear seat, the base connecting shaft 175 and the base connecting bracket 176 riding on the arms enable the mounting of the rear seat to be completed without the deformation nor breakage of the components.

As shown in FIG. 3, the bases 171a and 171b have holes 711a, 712a, and 711b, 712b, respectively, to be secured to the vehicle body. The bases 171a and 171b are bolted through the holes 711a, 712a and 711b, 712b to be secured to the vehicle body. The holes 711a and 711b are located at the front of the bases 171a and 171b, respectively, and the holes 712a and 712b are located at the rear of the bases 171a and 171b, respectively.

As shown in FIGS. 2 and 3, mounting positions 711a, 711b, 712a, and 712b of the bases 171a and 171b to the vehicle body are provided close to the base connecting shaft 175 and the base connecting bracket 176. This suppresses displacement of the mounting positions of the bases 171a and 171b to the vehicle body caused by carrying the unit 17a and accomplishes an easier operation for mounting the bases 171a and 171b to the vehicle body.

As shown in FIG. 1, the arms 172a, 172b are fixed to the seat back frame 16a. As shown in FIGS. 2 and 3, the hinges 173a, 173b are rotatable about the rotational shaft in the lateral direction of the vehicle body; and the arms 172a, 172b connected thereto pivot in the fore-and-aft direction of the vehicle body. The hinges 173a, 173b connect the arms 172a, 172b pivotally to the bases 171a, 171b.

Since the seat back frame 16a is fixed to the arms 172a, 172b, the angle of the seat back frame 16 changes with pivot of the arms 172a, 172b. As the arms 172a, 172b change their positions from the upright position to the forwardly collapsed position, the seat back frame 16a shows the same motion. As the arms 172a, 172b pivot about the hinges 173a, 173b to reverse (rise) from the forwardly collapsed position to the upright position, the seat back frame 16a rises in the direction away from the vehicle body and the bases 171a, 171b.

The rear seat 1 of the present embodiment comprises an electric device to adjust the seat back angle. In a preferred embodiment like the present embodiment, an entire seat back angle adjusting mechanism including the electric device is implemented in the unit 17a. Installing the entire seat back angle adjusting mechanism within the unit 17a permits to design seat bodies more flexibly and permits to design units to be applied to various types of seat bodies more easily.

Implementing the seat back angle adjustment mechanism within the unit outside the seat back accomplishes a thinner seat back to increase the volume capacities of cargo room in both the upright and the forwardly folded positions of the seat back. These effects are particularly enhanced when the rear seat 1 has a complex seat back angle adjustment mechanism like an electric seat back angle adjustment mechanism.

As shown in FIGS. 2 and 3, the unit 17a includes an electric actuator 177 and its controller 178. The electric actuator 177 and the controller 178 are secured to the bases 171a, 171b. The controller 178 controls the electric actuator 177 in response to a signal from a switch provided near the rear gate of the vehicle body or in front of the driver's seat.

A cable 771 of the electric actuator 177 is connected to a lever 731 of the hinge 173a. When the electric actuator 177 pulls the cable 771, the lever 731 pivots to release the lock mechanism of the hinge 173a. The lever 731 is connected to the other hinge 173b via a shaft 179. As the lever 731 pivots, the shaft 179 rotates to release the lock mechanism of the hinge 173b, too.

The hinges 173a, 173b are each urged so as to rotate forward by means of a spring. As the lock-released hinges 173a, 173b rotate forward, the arms 172a, 172b in the upright position collapse forward of the vehicle. This movement, which is in response to the user's switch operation, causes the seat back (seat back frame 16a) of the rear seat 1 automatically to collapse forward. Raising up the seat back (seat back frame 16a) can be made by the user's manual operation, or may be made electrically by installing a motor and an electric gear within the unit 17a.

As understood from the above descriptions, the vehicle rear seat and the unit according to the present embodiment can be easily applicable to various configurations. Specifically, they can be applied to a split-type rear seat or a bench-style rear seat by changing the lengths of the base connecting shaft 175 and the base connecting bracket 176. They can also meet the desired strength level or the desired structure of seat back angle adjustment mechanism by changing the specification of the hinges 173a, 173b to a desired one. For example, they can be easily applied to a rear seat where both folding the seat back forwardly and raising it up are performed by manual operation, where both folding the seat back forwardly and raising it up are performed by an electric device, or where the seat back angle adjustment mechanism has a reclining function for the seat back in addition to the fold-forward function.

For the seat back angle adjustment mechanism equipped with a plurality of manual or electric functions, including those mechanisms within the unit installed outside the seat body, allows application to various seat designs and accomplishes a thinner seat body.

As set forth above, the present invention has been described by way of a preferred embodiment, but is not limited to the above embodiment. A person skilled in the art can easily modify and add each element in the above embodiment within the scope of the invention. For example, the present invention is suitable for the rearmost rear seat in a vehicle, but is applicable to the rear seat at the middle row in a vehicle having three rows of seats. The preset invention is suitable for a rear seat, but does not eliminate the application to a front seat.

This application claims priority from Japanese Patent Application 2007-274516, filed Oct. 22, 2007, which is incorporated herein by reference in its entirety.

What is claimed is:

1. A vehicle seat whose seat back is foldable forwardly, comprising:
    a seat back frame,
    a seat cushion frame, and
    a unit connected to the seat back frame and the seat cushion frame comprising:
        a base connected to the seat cushion frame and fixed to a vehicle body;
        an arm secured to the seat back frame;
        a hinge connecting the arm pivotally to the base; and
        a connector connecting the base and the hinge.

2. The vehicle seat according to claim 1, wherein the unit comprises a pair of bases and a beam which is secured to each of the pair of bases to connect the pair of bases.

3. The vehicle seat according to claim 2, wherein:
    the unit comprises at least two beams for connecting the pair of bases;
    the two beams are each secured to both of the pair of bases to connect the pair of bases; and
    the pair of bases and the two beams form a rectangle.

4. The vehicle seat according to claim 2, wherein:
    the unit comprises at least two beams for connecting the pair of bases;
    the two beams are disposed away from each other in a fore-and-aft direction; and
    the pair of bases are each fixed to the vehicle body at positions away from each other in the fore-and-aft direction.

5. The vehicle seat according to claim 1, wherein the unit further comprises a pivot angle adjustment mechanism for the arm.

* * * * *